(12) United States Patent
Schuenemann

(10) Patent No.: US 12,321,289 B2
(45) Date of Patent: Jun. 3, 2025

(54) METHOD FOR THE REPEATED TRANSMISSION OF DEFINED DATA

(71) Applicant: Robert Bosch GmbH, Stuttgart (DE)

(72) Inventor: Oliver Schuenemann, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 131 days.

(21) Appl. No.: 18/447,532

(22) Filed: Aug. 10, 2023

(65) Prior Publication Data

US 2024/0086343 A1    Mar. 14, 2024

(30) Foreign Application Priority Data

Sep. 9, 2022 (DE) ............... 10 2022 209 392.5

(51) Int. Cl.
*G06F 13/16*    (2006.01)
*H04L 1/08*    (2006.01)

(52) U.S. Cl.
CPC ...... *G06F 13/1668* (2013.01); *G06F 13/1621* (2013.01); *H04L 1/08* (2013.01)

(58) Field of Classification Search
CPC ..... G06F 13/1621; G06F 13/1668; H04L 1/08
See application file for complete search history.

(56) References Cited

U.S. PATENT DOCUMENTS

| | | | |
|---|---|---|---|
| 6,421,705 B1* | 7/2002 | Northrup | G06F 9/44552 709/225 |
| 2009/0249026 A1* | 10/2009 | Smelyanskiy | G06F 9/3004 712/214 |
| 2023/0259479 A1* | 8/2023 | Zhao | G06F 13/28 710/305 |
| 2023/0261794 A1* | 8/2023 | Eberle | H04L 1/1628 714/748 |

OTHER PUBLICATIONS

S. W. Daniel et al., "A programmable routing controller for flexible communications in point-to-point networks," Proceedings of ICCD '95 International Conference on Computer Design. VLSI in Computers and Processors, Austin, TX, USA, 1995, pp. 320-325, doi: 10.1109/ICCD.1995.528828. (Year: 1995).*

* cited by examiner

*Primary Examiner* — Eric T Oberly
(74) *Attorney, Agent, or Firm* — NORTON ROSE FULBRIGHT US LLP

(57) ABSTRACT

A method for the repeated transmission of defined data from a data-transmitting module to a data-receiving module. Three data-transmission memories are used for carrying out the method, each of which has a data-memory block as well as a first memory bit for storing an access reservation of the data-transmitting module and a second memory bit for storing an access reservation of the receiving module. A pointer memory is also used for carrying out the method, in which a pointer to the current data-transmission memory is able to be stored.

11 Claims, 2 Drawing Sheets

METHOD FOR THE REPEATED TRANSMISSION OF DEFINED DATA

CROSS REFERENCE

The present application claims the benefit under 35 U.S.C. § 119 of German Patent Application No. DE 10 2022 209 392.5 filed on Sep. 9, 2022, which is expressly incorporated herein by reference in its entirety.

BACKGROUND INFORMATION

Systems for driver assistance or automated driving are made up of many individual software units which usually exchange data with one another. Preferably, each of these software units (often also called runnables, nodes or data-processing components or data-processing modules) has provided input data and provided output data.

In the systems indicated above, input data, e.g., data from sensors such as radar or video is processed in order to obtain more precise data from it for the highly automated driving function. For example, data pertaining to traffic signs is extracted from video data in a multi-level processing cascade of data-processing components.

Thus, the various data-processing components or data-processing modules regularly form a complex data-processing network with which raw data or sensor data is processed in order to carry out actions based on the sensor data. For instance, such actions may be control tasks within the context of an autonomous driving mode of a vehicle.

Efficient methods are necessary for the exchange of data among various data-processing components and data-processing modules. In such a data exchange, there is usually a data-transmitting module (also called transmitter) and a data-receiving module (also called receiver). Various demands may be placed on such a method for the exchange. One customary requirement is that the most up-to-date data possible should always be made available by the data-transmitting module to the data-receiving module. This holds true especially if similar defined data is to be exchanged on a regular basis between the data-transmitting module and the data-receiving module. For instance, an example for this would be a data-transmitting module which pre-processes camera data and provides edge data as defined data, as well as a data-receiving module which then processes this defined data in order to perform a traffic-sign recognition or a function of this nature. In such an application, it may not be necessary that each individual set of defined data provided be received by the data-receiving module. It is far more important that in each case the data-receiving module receives the most up-to-date defined data possible. For that, it is necessary that the data-transmitting module be able to provide the defined data without interruption and without regard to data-reading operations.

For such an application, a data-transmission method is necessary. Such data-transmission methods are also often referred to as message queues.

A further requirement is that such data-transmission methods must be carried out on a regular basis in what are referred to as shared memory environments (environments with divided memory). In shared memory environments, data-processing modules usually share one memory which the data-processing modules are able to access without access control of the operating system. The operating system makes the memory available to the data-processing modules and allows them access. However, the operating system does not control how the access of the data-processing modules to the memory is implemented. Such environments reduce the computing power necessary for the exchange of data between data-processing modules considerably. However, they include the risk that collisions may take place between accesses, since no higher instance prevents such collisions.

Existing message queues based on shared memory communication in various middlewares have the disadvantage that transmitter and receiver are able to mutually block each other. In addition, they require that both are able to have both read and write access to the shared memory.

SUMMARY

With the method according to the present invention described here and the device according to the present invention also described for carrying out this method, a message queue is described which allows that transmitter and receiver cannot block each other at any point in time. Moreover, this design approach gets along without shared read-write memory.

According to an example embodiment of the present invention, a method is provided for the repeated transmission of defined data from a data-transmitting module to a data-receiving module, three data-transmission memories being used for carrying out the method, each of which has a data-memory block as well as a first memory bit for storing an access reservation of the data-transmitting module and a second memory bit for storing an access reservation of the receiving module, a pointer memory also being used for carrying out the method in which a pointer to the current data-transmission memory is able to be stored. According to an example embodiment of the present invention, the method includes the following steps:
   a) Carrying out a data-write process with the following substeps:
      i) Ascertaining a data-transmission memory in which an access reservation is recorded neither in the first memory bit nor in the second memory bit;
      ii) Reserving of the data-transmission memory, ascertained in step a-i), by the data-transmitting module by setting an access reservation (10) in the first memory bit of the specific data-transmission memory;
      iii) Writing the defined data into the data-memory block of the data-transmission memory;
      iv) Setting a pointer in the pointer memory to the data-transmission memory used;
      v) Releasing the data-transmission memory by removing the access reservation set in step a-ii);
   b) Carrying out a data-read process with the following substeps:
      i) Ascertaining the data-transmission memory to be read out based on the pointer in the pointer memory;
      ii) Reserving, by the data-receiving module, of the data-transmission memory to be read out, by setting an access reservation in the second memory bit of the specific data-transmission memory;
      iii) Reading out the data from the data-memory block of the data-transmission memory;
      iv) Releasing the data memory by removing the access reservation set in step b-ii);

The method described here according to the present invention utilizes as special advantage that preferably exactly three data-transmission memories are provided for a 1:1 communication between a data-transmitting module and a data-receiving module. The modules may be any data-processing modules or data-processing components—which in particular are part of a system for providing a highly automated function in a motor vehicle.

The method according to the present invention implements what is referred to as a message queue. A message queue provides an asynchronous communication protocol, in that the sender (the data-transmitting module) and receiver (the data-receiving module) of messages do not have to interact simultaneously with the message queue. Via the second memory bit for storing an access reservation for the reading of a data-transmission memory, the data-reading module has the possibility of reserving data for the read operation. At the same time, the data-writing module is able to utilize one of the other two data-transmission memories to transmit current data.

Step a) and its substeps are carried out by the data-transmitting module. Step b) and its substeps are carried out by the data-receiving module. In doing so, both modules access one shared memory area in which the three data-transmission memories are provided.

Due to the data-reading access of the data-receiving module, one of the memories is almost always blocked for the read access. Regardless of how fast the data-receiving module reads the defined data, the data-transmitting module is able to write data in turns into the one or the other of the two remaining data-transmission memories. Thanks to the ascertaining and reserving of the free data-transmission memory according to steps a-i) and a-ii) as well as the setting of the respective access reservations in steps b-i) and b-ii), it is ensured that a data-transmission memory not currently reserved by an access reservation is always selected from the three data-transmission memories. By using the pointer in the pointer memory for indicating the most current data record in each case according to steps a-iv) and b-i), the data-transmission memory having the most up-to-date defined data is always made known to the data-receiving module.

Existing design approaches have usually used only two data-transmission memories. However, the design approach described here according to the present invention has significant advantages compared to such designs.

In using two data-transmission memories, it may happen that with the providing of new defined data, the data-transmitting module must overwrite the data written most recently or must wait until the most recently written data is read completely by the data-receiving module. As a result, the speed and the timeliness of the data transmission are reduced considerably. This may be avoided by the use of three data-transmission memories.

With the method according to the present invention, that is, with the message queue provided by the method described, a communication may take place between the data-transmitting module and the data-receiving module without shared read-write memory.

According to an example embodiment of the present invention, the data-transmitting module merely writes data or flags and pointers into the first memory bits, into the data-memory blocks and a pointer memory for the pointer. The data-transmitting module preferably also has access authorizations only for these parts of the data-transmission memory. The data-receiving module may preferably have only read access to these parts of the data-transmission memory.

According to an example embodiment of the present invention, the data-receiving module merely writes data or flags into the second memory bits. The data-receiving module preferably also has access authorizations only for these parts of the data-transmission memory. The data-transmitting module may preferably have only read access to these parts of the data-transmission memory.

According to an example embodiment of the present invention, it is especially advantageous if the method is repeated continuously in the manner of a loop, in order to constantly make up-to-date defined data available from the data-transmitting module to the data-receiving module.

In addition, according to an example embodiment of the present invention, it is advantageous if step a) and step b) are repeated constantly in overlapping fashion, shifted in time relative to each other, the substeps within steps a) and b) in each case being carried out sequentially one after the other.

Preferably, according to an example embodiment of the present invention, the data-receiving module and the data-transmitting module operate independently of each other and perpetually, so that the data-transmitting module always provides the data-receiving module with the most up-to-date data, which the data-transmitting module has already processed.

According to an example embodiment of the present invention, it is also advantageous if at least the data-transmitting module or the data-receiving module are both data-processing modules in a network for pre-processing raw data to be used for functions of a highly automated driving mode of a motor vehicle, the defined data transmitted between the data-transmitting module and the data-receiving module being pre-processed raw data which is further processed by the data-receiving module for the provision of functions of a highly automated driving mode.

In addition, according to an example embodiment of the present invention, it is advantageous if raw data includes at least the following types of data:
Sensor data of sensors on a motor vehicle,
Data from off-board data sources which is made available to the vehicle for a highly automated driving mode, and
Data kept ready in data memories within the vehicle for a highly automated driving mode.

According to an example embodiment of the present invention, it is likewise advantageous if the repeated transmission of defined data according to steps a) and b) is carried out among a plurality of data-processing modules within the network.

In addition, according to an example embodiment of the present invention, it is advantageous if during the ascertaining and reserving of the data-transmission memory in steps a-i) and
a-ii), all data-transmission memories are blocked for the execution of steps b-i) and b-ii).

Moreover, according to an example embodiment of the present invention, it is advantageous if in the course of ascertaining and reserving the data-transmission memory in steps a-i) and a-ii), it is first checked based on the first memory bit and the second memory bit whether a data-transmission memory is free, and then first of all, a provisional reservation is implemented, followed by a recheck of the first memory bit and the second memory bit.

Through this procedure with the provisional reservation, it is possible to ensure that no collision takes place between the data-receiving module and the data-transmitting module. As soon as the provisional reservation is set, the data-receiving module may no longer block this data-transmission memory with a read access. By the recheck after the provisional reservation, it may be determined whether this may have occurred between the selection of the respective data-transmission memory and the provisional reservation. If an access reservation by the data-receiving module was determined, the provisional reservation is removed again and preferably a new attempt is made to ascertain and reserve a data-transmission memory.

In addition, according to an example embodiment of the present invention, it is advantageous if in step a-i), a data-transmission memory is not considered for which a pointer is stored in the pointer memory.

According to an example embodiment of the present invention, stored in this data-transmission memory is the set of defined data most recently stored in each case, which is to be made available for the data-reading process, that is, for the data-receiving module. For this reason, the speed for carrying out step a-i) may be increased, if this data-transmission memory is not taken into account in step a-i).

The present invention also provides a device for processing data, including at least one data-transmitting module and one data-receiving module as well as at least three data-transmission memories and a pointer memory, the device being configured for carrying out the method disclosed herein.

It should be pointed out that the special advantages and design features portrayed in connection with the method described above are also usable and transferable to the device described in the following.

Furthermore, a computer-program product is to be described according to an example embodiment of the present invention, including commands which, upon execution of the computer-program product by a computer, prompt it to carry out the method described.

In addition, a machine-readable storage medium of the present invention is to be described here, including commands which, upon execution by a computer, prompt it to carry out the method disclosed herein.

The method described and the device described according to the present invention are explained in the following with the aid of the figures.

DETAILED DESCRIPTION OF EXAMPLE EMBODIMENTS

Figure 1:
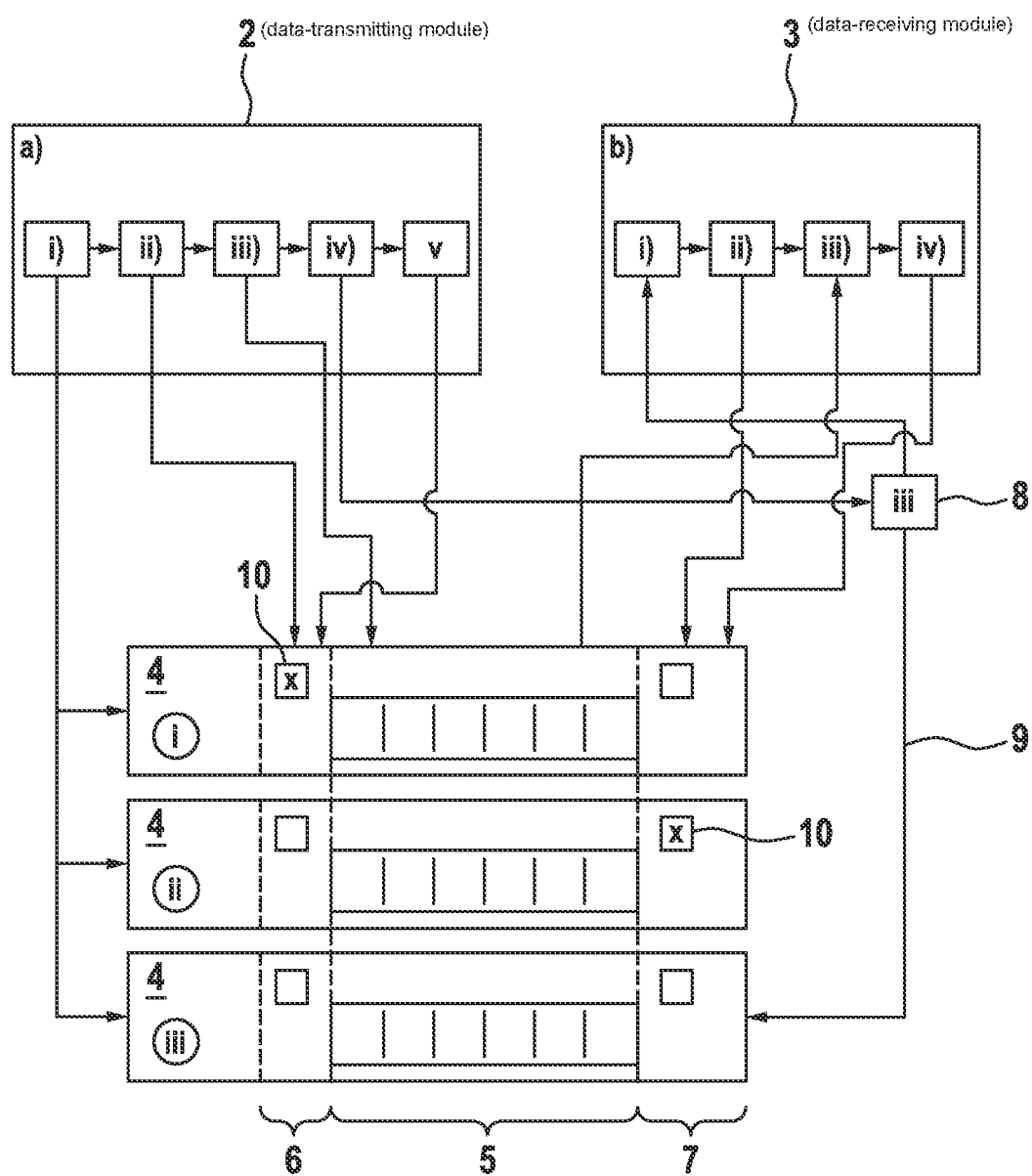
FIG. 1 shows a schematic representation of the device according to an example embodiment of the present invention with reference to the method according to an example embodiment of the present invention.

FIG. 1 shows a data-transmitting module 2 and a data-receiving module 3, data-transmitting module 2 transmitting defined data 1 to data-receiving module 3. For this purpose, a total of three data-transmission memories 4 are provided, each of which has a data-memory block 5 for storing defined data 1 to be transmitted, as well as a first memory bit 6 for placing an access reservation 10 of data-transmitting module 2 and a second memory bit 7 for placing an access reservation 10 of data-receiving module 3.

Step a) with substeps i) to v) is carried out in data-transmitting module 2. Step b) with substeps i) to iv) is carried out in data-receiving module 3.

In step a-i), first of all a data-transmission memory 4 is ascertained in which neither first memory bit 6 nor second memory bit 7 is set, and which therefore is not currently being used. Regarded as a further restriction is that only one data-transmission memory 4 is ascertained, to which the pointer stored in the pointer memory is not presently pointing. In step a-ii), specific data-transmission memory 4 is then reserved, by setting first memory bit 6.

According to step a-iii), defined data 1 is then written into data-memory block 5 of specific data-transmission memory 4. As soon as this is concluded, in step a-iv), pointer 9 in the pointer memory is set to this data-memory block 5. FIG. 1 shows by way of example that pointer 9 in data-transmission memory 4 is set to third data-transmission memory 4 marked with (iii). At the end of step a), in step a-v), data-transmission memory 4 is released by removing access reservation 10 set in first memory bit 6 of respective data-transmission memory 4.

In parallel with but possibly shifted in time relative to the execution of step a) with its substeps i) to v) in data-transmitting module 2, step b) with substeps i) to iv) is carried out in data-receiving module 3. First of all, in step b-i), data-transmission memory 4 to be read out, in which the current set of defined data 1 is stored, is ascertained. Subsequently in step b-ii), data-transmission memory 4 to be read out is reserved by data-receiving module 3, by setting an access reservation 10 in second memory bit 7. In step b-iii), defined data 1 is now read out from data-transmission memory block 4. As soon as the read-out of defined data 1 is concluded, the data-transmission memory is released by the removal of the access reservation, set in step b-ii), in second memory bit 7.

Figure 2:
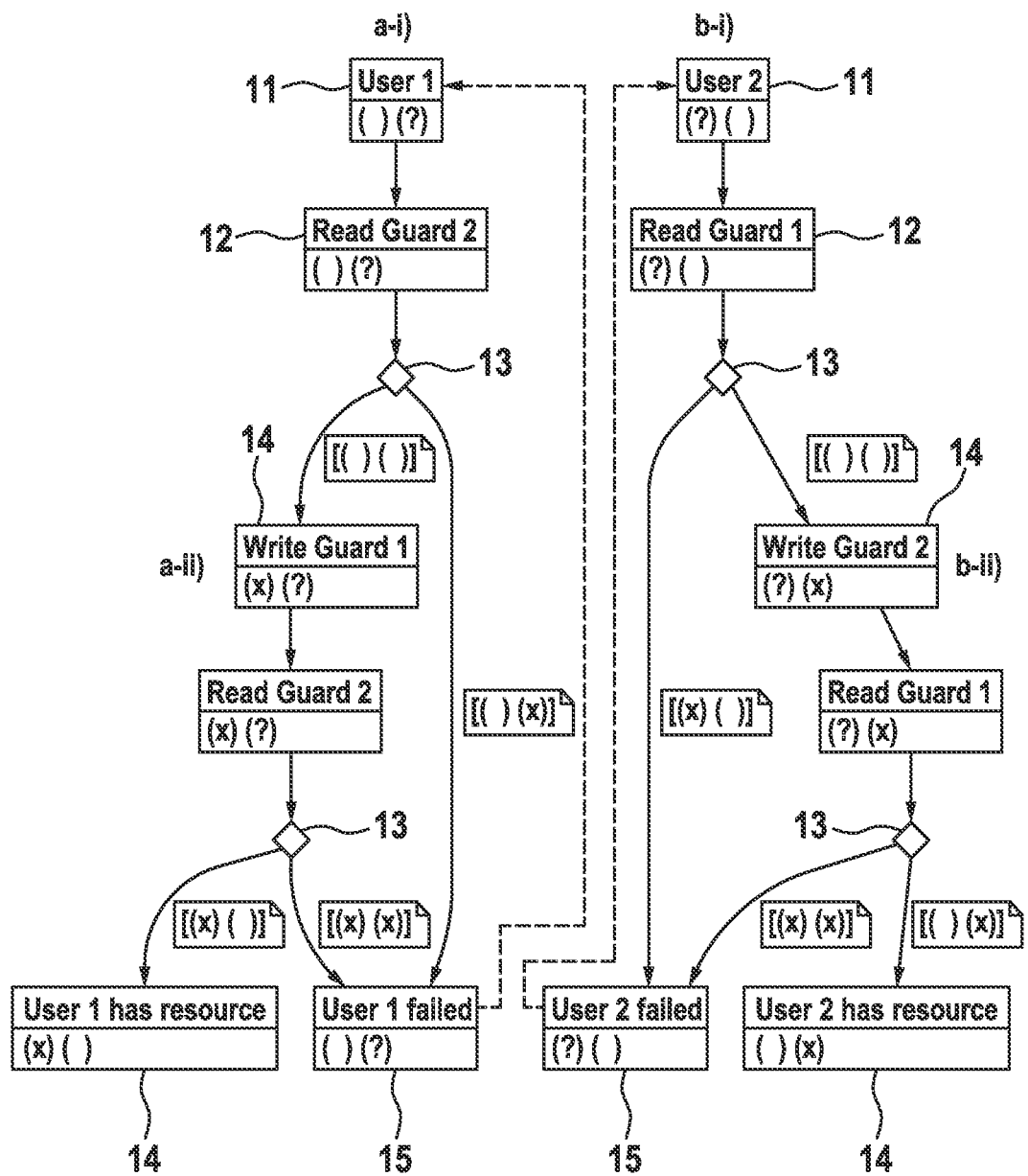
FIG. 2 shows processes for reserving data-transmission memories in the method according to an example embodiment of the present invention.

FIG. 2 shows the processes according to steps a-i) and a-ii) as well as b-i) and b-ii), which are carried out to ascertain and reserve the data-transmission memory. Thus, FIG. 2 shows two detailed illustrations as to how steps a-i) and a-ii) or b-i) and b-ii) may be implemented. The ascertainment and reservation are necessary in each case so that the writing of the data according to step a-iii) and the reading of the data according to step b-iii) may be carried out undisturbed.

Steps a-i) and a-ii) as well as b-i) and b-ii) are implemented in such a way that collisions between the write access of the data-transmitting module and the read access of the data-receiving module are prevented. To that end, the access to a data-transmission memory by the respective other module is blocked during steps a-i), a-ii) or b-i) und b-ii). In each case, however, this blockade is only in effect for one of the three data-transmission memories and only so long as the respective data-transmission memory is a candidate for the reservation in step a-ii) or b-ii).

FIG. 2 shows a flowchart of a program sequence which is carried out for each data-transmission memory in order to ascertain and reserve one data-transmission memory, and carried out until a data-transmission memory has been successfully reserved. In each block of the flowchart, the two memory bits are represented in each instance by "(_) (_)", an (x) representing when an access reservation was recognized in a memory bit, and (?) representing when an access reservation is to be checked in a memory bit. The first position "(x) (_)" in each instance represents the first memory bit for the storing of an access reservation of the data-transmitting module, and the second position "(_) (x)" in each instance represents the second memory bit for storing an access reservation of the data-receiving module.

The implementations of steps a-i) and a-ii) and of steps b-i) and b-ii) in FIG. 2 basically correspond to each other, the check in each case being carried out the other way round. This means that in carrying out steps a-i) and a-ii), the second memory bit is checked to determine whether an access reservation by the data-receiving module is present, and conversely, in carrying out steps b-i) and b-ii), the first memory bit is checked to determine whether an access reservation by the data-transmitting module is present. The following explanation relates to the illustration of steps a-i) and a-ii) in FIG. 2 and can be transferred to the illustration of steps b-i) and b-ii), in doing so, in each case it then being necessary to exchange the first memory bit and the second memory bit, that is, the data-transmitting module and the data-receiving module.

After process start 11, first of all a reservation check 12 is started for the second memory bit in order to determine whether an access reservation by the data-receiving module is present for the respective data-transmission memory. This is represented with the following state of the memory bit "(_) (?)". A program branch 13 then ensues. If no reservation is present, none of the memory bits is set and this is indicated as follows "(_) (_)". A provisional reservation 14 is implemented for the data-transmitting module, which forms a first part of step a-ii). With the provisional reservation, the first memory bit is set, so that the state changes to "(x) (_)". If a reservation is present and the state "(_) (X)" was determined, then the respective data-transmission memory may not be used. An abort 15 of the reservation process is carried out.

After provisional reservation 14, a new reservation check 12 is initiated. This is necessary in order to prevent collisions. Prior to provisional reservation 14, there is the risk of a process collision between the data-transmitting module and the data-receiving module. It is possible that between process start 11 and provisional reservation 14, the respective other process has likewise implemented an access reservation. In order to prevent this, after provisional reservation 14, reservation check 12 is initiated again. The state then present is as follows "(x) (?)". A process branch 13 then ensues again. If after this process branch 13, the state "(x) (_)" was determined, this is accepted as final reservation 16. If after this process branch 13, the state "(x) (x)" was determined, the state of the first memory bit is reset so that subsequently the state "(_) (?)" is present again, like before the first reservation check. An abort 15 of the reservation process is likewise carried out.

After abort 15 of the reservation process, a restart 17 is initiated, which again leads to a process start 11. This occurs until a data-transmission memory has been ascertained with which the further process steps a-iii), etc. and b-iii), etc. may then be carried out.

What is claimed is:

1. A method for repeated transmission of defined data from a data-transmitting module to a data-receiving module, three data-transmission memories being used for carrying out the method, each of which has a data-memory block, a first memory bit for storing an access reservation of the data-transmitting module, and a second memory bit for storing an access reservation of the receiving module, a pointer memory also being used for carrying out the method, in which a pointer to the current data-transmission memory is able to be stored, the method comprising the following steps:
   a) carrying out a data-write process, including the following substeps:
      i) ascertaining a data-transmission memory of the data transmission memories in which an access reservation is recorded neither in the first memory bit nor in the second memory bit;
      ii) reserving the data-transmission memory ascertained in step a-i), by the data-transmitting module by setting an access reservation in the first memory bit of the ascertained data-transmission memory;
      iii) writing the defined data into the data-memory block of the ascertained data-transmission memory;
      iv) setting a pointer in the pointer memory to the ascertained data-transmission memory; and
      v) releasing the ascertained data-transmission memory by removing the access reservation set in step a-ii);
   b) carrying out a data-read process having the following substeps:
      i) ascertaining a data-transmission memory of the data-transmission memories to be read out based on the pointer in the pointer memory;
      ii) reserving, by the data-receiving module, the ascertained data-transmission memory to be read out, by setting an access reservation in the second memory bit of the ascertained specific data-transmission memory to be read;
      iii) reading out the defined data from the data-memory block of the ascertained data-transmission memory to be read;
      iv) releasing the ascertained data-transmission memory to be read by removing the access reservation set in step b-ii).

2. The method as recited in claim 1, wherein the method is repeated continuously in a loop, to constantly make up-to-date defined data available from the data-transmitting module to the data-receiving module.

3. The method as recited in claim 1, wherein step a) and step b) are repeated constantly in overlapping fashion, shifted in time relative to each other, the substeps within each of steps a) and b) being carried out sequentially one after the other.

4. The method as recited in claim 1, wherein at least the data-transmitting module and the data-receiving module are both data-processing modules in a network for pre-processing raw data to be used for functions of a highly automated driving mode of a motor vehicle, the defined data transmitted between the data-transmitting module and the data-receiving module being pre-processed raw data which is further processed by the data-receiving module for provision of functions of a highly automated driving mode.

5. The method as recited in claim 4, wherein the raw data includes at least the following types of data:
   sensor data of sensors on a motor vehicle,
   data from off-board data sources which is made available to the vehicle for a highly automated driving mode,
   data kept ready in data memories within the vehicle for a highly automated driving mode.

6. The method as recited in claim 4, wherein the repeated transmission of the defined data according to steps a) and b) is carried out among a plurality of data-processing modules within the network.

7. The method as recited in claim 1, wherein during the ascertaining and reserving of the data-transmission memory in steps a-i) and a-ii), all data-transmission memories are blocked for execution of steps b-i) and b-ii).

8. The method as recited in claim 1, wherein in the ascertaining and reserving of the data-transmission memory in steps a-i) and a-ii), it is first checked based on the first memory bit and the second memory bit whether a data-transmission memory is free, and then a provisional reservation is implemented, followed by a recheck of the first memory bit and the second memory bit.

9. The method as recited in claim 1, wherein in step a-i), a data-transmission memory is not considered for which a pointer is stored in the pointer memory.

10. A device for processing data, comprising:
at least one data-transmitting module; and
at least one data-receiving module;
at least three data-transmission memories, each of which has a data-memory block, a first memory bit for storing an access reservation of the data-transmitting module, and a second memory bit for storing an access reservation of the receiving module; and
a pointer memory in which a pointer to the current data-transmission memory is able to be stored;
wherein the device is configured to:
  a) carry out a data-write process, including the following substeps:
    i) ascertaining a data-transmission memory of the data transmission memories in which an access reservation is recorded neither in the first memory bit nor in the second memory bit;
    ii) reserving the data-transmission memory ascertained in step a-i), by the data-transmitting module by setting an access reservation in the first memory bit of the ascertained data-transmission memory;
    iii) writing the defined data into the data-memory block of the ascertained data-transmission memory;
    iv) setting a pointer in the pointer memory to the ascertained data-transmission memory; and
    v) releasing the ascertained data-transmission memory by removing the access reservation set in step a-ii);
  b) carry out a data-read process having the following substeps:
    i) ascertaining a data-transmission memory of the data-transmission memories to be read out based on the pointer in the pointer memory;
    ii) reserving, by the data-receiving module, the ascertained data-transmission memory to be read out, by setting an access reservation in the second memory bit of the ascertained specific data-transmission memory to be read;
    iii) reading out the defined data from the data-memory block of the ascertained data-transmission memory to be read;
    iv) releasing the ascertained data-transmission memory to be read by removing the access reservation set in step b-ii).

11. A non-transitory machine-readable storage medium on which is stored a computer program including commands for repeated transmission of defined data from a data-transmitting module to a data-receiving module, three data-transmission memories being used, each of which has a data-memory block, a first memory bit for storing an access reservation of the data-transmitting module, and a second memory bit for storing an access reservation of the receiving module, a pointer memory also being used, in which a pointer to the current data-transmission memory is able to be stored, the commands, when executed by a computer, causing the computer to perform the following steps:
  a) carrying out a data-write process, including the following substeps:
    i) ascertaining a data-transmission memory of the data transmission memories in which an access reservation is recorded neither in the first memory bit nor in the second memory bit;
    ii) reserving the data-transmission memory ascertained in step a-i), by the data-transmitting module by setting an access reservation in the first memory bit of the ascertained data-transmission memory;
    iii) writing the defined data into the data-memory block of the ascertained data-transmission memory;
    iv) setting a pointer in the pointer memory to the ascertained data-transmission memory; and
    v) releasing the ascertained data-transmission memory by removing the access reservation set in step a-ii);
  b) carrying out a data-read process having the following substeps:
    i) ascertaining a data-transmission memory of the data-transmission memories to be read out based on the pointer in the pointer memory;
    ii) reserving, by the data-receiving module, the ascertained data-transmission memory to be read out, by setting an access reservation in the second memory bit of the ascertained specific data-transmission memory to be read;
    iii) reading out the defined data from the data-memory block of the ascertained data-transmission memory to be read;
    iv) releasing the ascertained data-transmission memory to be read by removing the access reservation set in step b-ii).

\* \* \* \* \*